United States Patent [19]
Thastrup

[11] 3,877,491
[45] Apr. 15, 1975

[54] INSULATED PIPE SYSTEMS
[75] Inventor: Ove Thastrup, Fredericia, Denmark
[73] Assignee: A/S E. Ramussen, Fredericia, Denmark
[22] Filed: Feb. 4, 1972
[21] Appl. No.: 223,676

Related U.S. Application Data
[63] Continuation of Ser. No. 21,027, March 19, 1970, abandoned.

[52] U.S. Cl................................. 138/149; 138/161
[51] Int. Cl............................................. F16l 59/14
[58] Field of Search ....... 285/294, 297, 47, 53, 373, 285/21; 24/284; 138/149, 148, 157, 161

[56] References Cited
UNITED STATES PATENTS

| | | | |
|---|---|---|---|
| 1,785,314 | 12/1930 | Kelly | 24/284 |
| 2,255,657 | 9/1941 | Freedman | 138/157 X |
| 2,958,546 | 11/1960 | Lee | 285/21 |
| 3,369,826 | 2/1968 | Boosey et al. | 285/47 |
| 3,453,716 | 7/1969 | Cook | 138/149 X |

FOREIGN PATENTS OR APPLICATIONS
794,580  5/1958  United Kingdom

Primary Examiner—Jerry W. Myracle
Attorney, Agent, or Firm—Craig & Antonelli

[57] ABSTRACT

A heat insulated pipe system such as a subterranean district heating tube system comprising a number of joined insulated pipe units of the type comprising one or more interior conductor tubes, an exterior protective mantle tube of synthetic material, and a heat insulating material interposed therebetween. The conductor tubes are exposed adjacent the ends of each pipe unit and joined in situ by welding or otherwise. Over each joint there is mounted a tube casing bridging the joint and overlapping the adjacent ends of the protective tubes in tight connection therewith. These tube casings are constructed as half-cylindrical shells of a rigid material which are tightened together so hard around the ends of the protective tubes that these ends are compressed to a reduced diameter. Alternative embodiments include a pair of half-cylindrical shells of rigid plate material and means for tightening these shells shaped so as to form either straight tubes, tube elbows or tube tees, when assembled.

38 Claims, 7 Drawing Figures

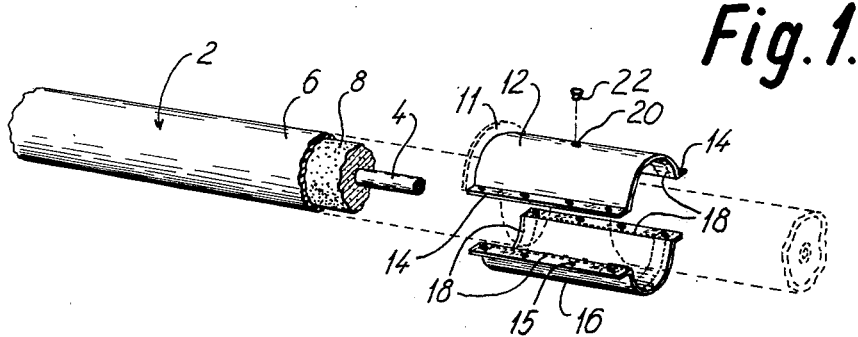
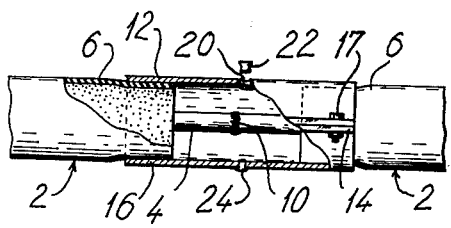
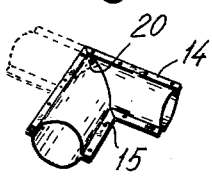
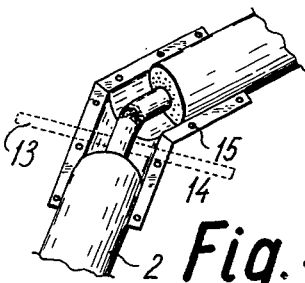
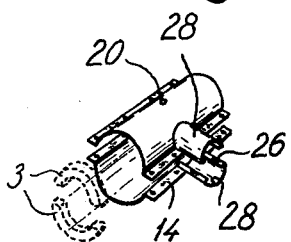
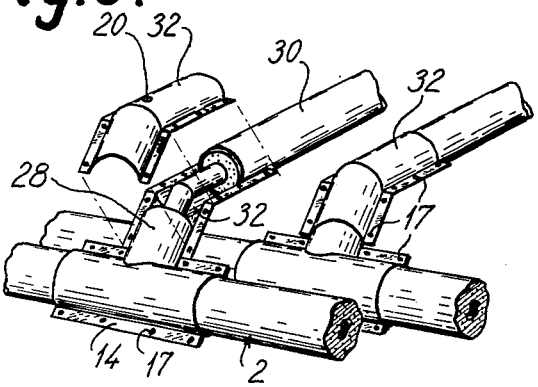
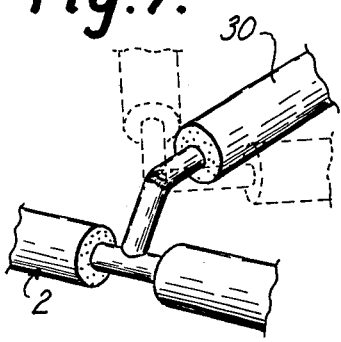

INSULATED PIPE SYSTEMS

BACKGROUND AND SUMMARY OF THE INVENTION

This application is a continuation of my copending application Ser. No. 21,027, filed Mar. 19, 1970 now abandoned.

The present invention relates to a heat insulated pipe system such as a subterranean district heating tube system comprising a number of joined insulated pipe units of the type comprising one or more interior conductor tubes, an exterior protective mantle tube of synthetic material, and a heat insulating material interposed therebetween, said conductor tubes being exposed adjacent the ends of each pipe unit and joined in situ by welding or otherwise, whereas over each joint there is mounted a tube casing bridging the joint and overlapping the adjacent ends of the protective tubes in tight connection therewith.

Such systems, made from prefabricated insulated pipe units, are used extensively because they are easy to mount and because the conductor tubes will normally be protected against corrosion resulting from introduction of moisture from the surroundings better than in such systems where the insulating material is placed around the tubes after the mounting thereof. Normally these prefabricated pipes are made with a relatively strong outer mantle tube, eg., of polyethylene and an insulating material of polyurethane foam so as to be very resistant against mechaical and chemical attacks as well as against intrusison of moisture which would damage the insulation and make corrosion on the conductor tubes possible.

However, especially with regard to a possible moisture intrusion there are weak points in these systems, viz. at the joints. The said tube casings bridging the joints in order to provide for exterior tightness normally consist of plastic tube pieces which, after the welding together of the conductor tube ends and after pressure testing of these joints, are displaced from a retracted position on one of the jointed pipe ends into a position in which they bridge the joint. Suitable sealing means such as sealing rings or sealing substances may be used to provide tightness against the surfaces of the mantle tubes at both sides of the joint. Since the pipes should exist for many years in humid surroundings the said joints should be made extremely tight. However, it is not easy to obtain full security for a perfect and permanent seal when it is desired to allow a certain axial movability of the outer pipe parts adjacent the joints so as to enable thermal movements of the protective tubes relatively to the conductor tubes. It is common practice to fill out the space inside the tube casing with an insulating material, but not even this feature is sufficient to give full security against intrusion of corroding moisture. Moreover, with the use of displaceable tube casings even of the shrinkage type the joining work will be more difficult to carry out the higher the demands for a perfect seal are.

It is a main object of the invention to provide a pipe system in which the joining work is easy to carry out with a high degree of security for a perfect and durable tightness in the joints.

It is a further object of the invention to provide a pipe system in which the tube casings are constituted in a simple manner and are easy to mount directly in their positions of use by means of a tightening force exerted in a plane normal to the tube.

Still a further object of the invention is to provide a pipe system in which the tube casings provide an absolutely rigid interconnection between adjacent ends of the plastic tubes, the invention here making use of the principle that it is in fact not necessary to provide for a relative axial movability of the parts adjacent the joints.

According to the invention the tube casings consist of half-cylindrical tube shells of a rigid material such as iron or steel, these shells being tightened so hard together around the ends of the protective plastic tubes that these ends are compressed to a reduced diameter. With this arrangement, it is possible to provide a high sealing pressure between the surfaces of the plastic tubes and the assembled casings. Since it is not necessary to provide for a relative axial movability of the parts adjacent the joints, it is allowable to work with an absolutely rigid interconnection between adjacent ends of the plastic tubes.

The casing shells may be tightened together in several possible manners, e.g., by means of a round-going tightening band. However, when the shells are sufficiently rigid it is preferred to use shells having flanges projecting outwardly from the side edges thereof. These flanges are used directly as combined tightening and sealing flanges which are tightened together by means of bolts or otherwise.

The invention furthermore relates to the arrangement of said casings as separate elements or fittings for use in the system. According to the invention, these casings comprise a pair of half-cylindrical shells of steel plate or corresponding rigid plate material and means for tightening these shells tightly around the ends of the said plastic tubes. These shells may well be shaped as bends or elbows as well as T-pieces so that the system may be built according to any desired pattern with the use of a low number of different joining elements. In the said known system in which displaceable casings are used it is common practice to also use prefabricated insulated pipe bendings and T-pieces which are difficult to manufacture due to the oblique joints of the plastic tubes. In the system according to the invention, with the use of the shell fittings, it is not necessary to make use of such special pipe sections at all, since the fittings in the system according to the invention will automatically substitute the outer protective tubes in the bendings and branchings. This feature involves a significant advantage of the invention.

BRIEF DESCRIPTION OF THE DRAWINGS

In the following the invention is described in more detail with reference to the accompanying drawings in whcih:

FIG. 1 is a perspective view, partly in section, illustrating the manner in which a tube casing according to the invention is mounted at a joint in a tube system;

FIG. 2 is a side view, partly in section, of the joint, and

FIGS. 3–7 are perspective views illustrating further embodiments of the tube casing according to the invention.

DETAILED DESCRIPTION OF THE DRAWINGS

In the drawings, FIGS. 1 and 2 show a joint between two insulated pipe units 2, each comprising an interior conductor tube 4 for hot water and an outer protective mantel tube 6 preferably of polyethylene. An insulating material 8, such as polyurethane foam, fills out the annular space pipe length 2 in such a manner that between two consecutive pipes there is sufficient space to join the ends of the tubes 4 by welding. After this welding together of the tube ends, a half-cylindrical plate iron shell 12 having outwardly projecting edge flanges 14 is placed on the top of the joint in such a manner that at its opposed ends it rests against the top side of the ends of the plastic tubes 6, and a corresponding shell 16 is placed in a corresponding position underneath the shell 12. As shown in dotted lines in FIG. 1, stripes 18 of a sealing and adhesive compound such as Rubstik are applied in advance to both shells. The compound stripes 18 are applied in such a manner that they will provide tightness partly between the flanges 14 and partly between the half-cylindrical end portions of the shells and the surface of the adjacent ends of the plastic tubes 6. The shells are thereafter tightened together by means of tightening bolts 17 through holes 15 in the flanges 14.

As most clearly shown in FIG. 2, the length of the shells 12 and 16 is so adapted that the tube casing formed by these shells overlap the adjacent plastic tube ends sufficiently to ensure a firm interconnection between these elements. It is also shown that the shells in their tightened condition compress the ends of the tubes 6 a little, the radius of the interior sides of the shells being a little smaller than the radius of the exterior side of the tubes 6. The actual compression of the ends of the tubes 6 amounts preferably to 0.5 – 2 mm as measured on the tube diameter.

In the top side of the upper shell 12 there is provided a hole 20 through which an insulating compound such as a foaming polyurethane liquid may be poured down into the space around the exposed tube ends 4. The use of an expanding foam material will contribute to provide tightness in the joint, and besides the foam material expanding under high pressure will be able to indicate leakages should it break through to the outer surface of the jointed portions. When the joint has thus been filled with insulating material the hole 20 is closed by means of a stopper 22.

In order to avoid corrosion on the shells 12 and 16 all surface parts of these shells are provided with a corrosion protective coating such a layer of melted out polyethylene. Moreover, a cathodic protection of the shells may be used, according to principles known per se.

The two shells 12 and 16 may be of identical shape, whereby the hole 20 in the lower shell 16 is permanently closed by means of a stopper 24.

The shape of the shells may be other than staight half-cylindrical. As shown in FIGS. 3 and 4, the shells may be shaped as bends or elbows defining any desired angle, preferably a few standard angles. The single shell halves of the elbows may be produced in simple manner by cutting and welding plate pieces corresponding to the straight shells, and also the mounting thereof corresponds to that of the straight shells.

It will, of course, be possible to make shells shaped as T-pieces as indicated in supplementary dotted lines in FIG. 3 which are adapted to be mounted directly over a T-junction of pipes 2. Branchings from a pipe pair in a district heating system are normally made so as to extend inclined upwardly and thereafter horizontally through a tube bend so that the branched off tube can pass the other main pipe of the pipe pair, as shown in FIG. 6. It is also possible to design a joining element according to the invention in such a manner that two shell pieces are sufficient to cover the combined branching and bending, but this would require a very accurate positioning and welding together of the tube pieces in order to avoid strain in the joint. According to a further feature of the invention, therefore, it is preferred to use two different joining elements, viz. a T-piece and an elbow, whereby one end of the elbow is tightly connected to the branch of the T-piece, preferably by surrounding this branch rather than by being surrounded by the branch.

In order to simplify the arrangement, the branch stud 28 (FIG. 5) of the T-piece is not provided with outwardly protruding edge flanges, but with inwardly protruding flanges 26 so that the exterior surface of the assembled branch 28 is unbroken circular-cylindrical. With this arrangement, the branch stud 28 may be surrounded by one end of another standard joining element according to the invention, whereby the flanges 26 can take up a hard pressure as exerted by the said surrounding element end. As shown in FIG. 5, the branch 28 may have reduced radius for covering a branch tube of reduced diameter relatively to the main tube. When the further joining element is tightened around the branch 28, this branch will not in itself be compressible so that the exterior diameter of the assembled branch portions should be somewhat smaller than the exterior diameter of the insulated pipe which is branched off from the main pipe, whereby a standard joining element for the particular reduced pipe dimension may be used directly between the T-stud 28 and the end of the exterior protective tube of the branch pipe.

FIG. 6 illustrates a system with a double branching off as described above. It will be noted that first there has been mounted a T-formed casing of the type shown in FIG. 5 on the main pipes 2, whereafter the branch stud 28 thereof is connected to the branch pipe 30 by means of shells 32, which in assembled condition constitutes a tube bend in vertical plane. After the mounting of the different shells the cavity therebetween is filled with insulating material through the opening 20 in the upper shell of the tube bend 32.

The branch tube 30 should not necessarily assume a position in a plane perpendicular to the main pipe 2. If the tube 30 is turned out, for example, 15° to any side of this plane, it will still be possible to use the same bent casing 32 when it is mounted in a corresponding turned position. That is, within a certain limit the pipe 30 may be mounted in a desired oblique position as illustrated in FIG. 7.

As shown in dotted lines in connection with FIG. 5, if an insulated pipe shall be joined to a pipe of smaller diameter it will be possible to use a split reduction ring 3, which is tightened in between the end of the casing and the exterior plastic tube of the smaller pipe so that for this purpose it is not necessary to use casings which are in themselves provided with different diameters at their opposed ends.

The system according to the invention enables an easy fastening of any joint to the surroundings. As shown in dotted lines in FIG. 4, one of the shell parts at the joint may be provided with outwardly projecting portions such as pieces of flat iron 13, which are embedded in the edge flanges 14 so as to have their upper surface flushing with the surface of the flanges 14 and extending inwardly from each side to a point where it may be connected by welding to the conductor tube 4. It will be appreciated that in this manner not only the casing shells, but also the conductor tube may be fastened to the surroundings by anchoring the protruding ends of the cross pieces 13.

Shells of the type shown in FIG. 1 may also be used for securing the pipes where they traverse the wall of a building. For this purpose the shells may be tightened around the tube portion extending through a prepared hole in the wall, and especially if the shells are provided with outwardly projecting portions such as end flanges 11, the shells and therewith the traversing pipe portion will be anchored to the wall when the said hole is filled out with concrete or otherwise closed tightly around the shells.

While I have shown and described several embodiments in accordance with the present invention, it is understood that the same is not limited thereto but is susceptible of numerous changes and modifications, and I therefore do not wish to be limited to the details shown and described herein but intend to cover all such changes and modifications as are within the scope of those skilled in the art.

I claim:

1. A heat insulated pipe system comprising: a plurality of insulated pipe units; each pipe unit including an axially rigid interior conductor tube, an exterior protective mantel tube of relatively rigid synthetic material, and a heat insulating material interposed between said interior and exterior tubes; each of said conductor tubes having an end portion extending beyond the end of the corresponding exterior tube of the respective pipe unit, the end portion of one conductor tube being axially rigidly joined with the end portion of another conductor tube to form a conductor tube joint, tube casing means for bridging the conductor tube joint and overlapping adjacent end portions of the exterior tubes, and clamping means for rigidly and sealingly clamping said tube casing means around the end portions of the exterior tubes, wherein said interior tubes, exterior tubes, tube casing means, and clamping means are constructed such that axial movement of the interior tubes with respect to one another and axial movement of the exterior tubes with respect to one another is substantially precluded with a consequent substantial limitation of axial movement of the interior tubes with respect to the exterior tubes at least in the area of said conductor tube joints during use of this system with temperature changes induced by a fluid medium flowing through said conductor tubes at a different temperature than the medium surrounding the exterior tubes.

2. A pipe system according to claim 1, wherein said tube casing means comprises a plurality of part-cylindrical shells of rigid material.

3. A pipe system according to claim 2, wherein said plurality of part-cylindrical shells includes two half-cylindrical shells.

4. A pipe system according to claim 3, characterized in that said clamping means includes means for clamping said half-cylindrical shells so tightly around said exterior tubes that the end portions of said exterior tubes are compressed to a reduced diameter.

5. A pipe system according to claim 4, characterized in that said exterior tubes are compressed such that both the inner and outer diameter of said end portions of said exterior tubes are reduced.

6. A pipe system according to claim 4, characterized in that the entire axial extent of the exterior tubes overlapped by said shells is compressed to a reduced diameter.

7. A pipe system according to claim 4, characterized in that the shells have an interior radius which is slightly smaller than the exterior radius of the protective tubes.

8. A pipe system according to claim 4, characterized in that the shells are provided with longitudinal, outwardly projecting tightening and sealing flanges along their joined edges.

9. A pipe system according to claim 4, characterized in that the shells are constructed of rigid plate material such as steel plate and in that means are provided for tightening the shells tightly around the ends of the exterior tubes.

10. A pipe system according to claim 4, characterized in that the shells are shaped with a bend so that in assembled condition they form a tube elbow covering correspondingly angled pipe units.

11. A pipe system according to claim 4, characterized in that the shells are provided with half-cylindrical branch portions in such a manner that in assembled condition they form a T-section.

12. A pipe system according to claim 3, characterized in that said tube casing means forms an axially rigid connection between the end portions of the exterior tubes.

13. A pipe system according to claim 3, wherein said clamping means extend through outwardly protruding flanges at said shells.

14. A pipe system according to claim 1, wherein said heat insulating material completely fills the space between said interior and exterior tubes.

15. A pipe system according to claim 14, characterized in that a combination adhesive and sealing compound is provided between the shells and the exterior tubes.

16. A pipe system according to claim 15, characterized in that said compound is Rubstick or the like.

17. A pipe system according to claim 15, further comprising flanges provided adjacent the joined edge portions of the shells, characterized in that a sealing compound is also interposed between said flanges.

18. A pipe system according to claim 14, further comprising a split reduction ring tightened in between said shells and said exterior tubes for accommodating clamping of exterior tubes of reduced diameter as compared to the inner dimensions of said shells.

19. A pipe system according to claim 14, characterized in that at least one of the shells is provided with inwardly protruding portions which are welded directly to the interior tube.

20. A pipe system according to claim 19, characterized in that said at least one shell is also provided with outwardly protruding anchoring portions for anchoring the joined pipe units to adjacent building structure and the like.

21. A pipe system according to claim 20, characterized in that said inwardly and outwardly protruding portions are formed as a single bar extending radially outwardly from the interior tube.

22. A pipe system according to claim 14, characterized in that said pipe units form part of a subterranean district heating tube system.

23. A pipe system according to claim 14, characterized in that each of said interior tubes are axially rigid at least along that portion of their length extending beyond the ends of the exterior tubes.

24. A pipe system according to claim 14, characterized in that each of said interior tubes are axially rigid throughout their length.

25. A pipe system according to claim 14, characterized in that said interior tubes have a diameter substantially less than said exterior tubes.

26. A pipe system according to claim 14, characterized in that the end portions of the interior tubes are joined by welding.

27. A pipe system according to claim 14, wherein said interior and exterior tubes are concentric to one another.

28. A pipe system according to claim 27, wherein said tube casing means comprises a plurality of part-cylindrical shells of rigid material.

29. A heat insulated pipe system such as a subterranean district heating tube system including a number of jointed insulated pipe units; each of said pipe units comprising at least one interior conductor tube, an exterior protective mantel tube of synthetic material, and a heat insulating material interposed between said exterior and interior tubes; said conductor tubes being exposed adjacent the ends of each pipe unit and being joined one to another by welding or otherwise, each joint between two respective pipe units being provided with a tube casing bridging the joint and overlapping the adjacent ends of the protective tubes in tight connection therewith, said tube casings comprising a pair of half-cylindrical shells of steel plate or similar rigid plate material, said shells having longitudinal outwardly projecting tightening and sealing flanges along their edges to be joined, means being provided for tightening said shells around the ends of the protective tubes to such an extent that these ends are compressed to a reduced diameter, said shells being provided with half-cylindrical branch portions in such a manner that in assembled condition they form a T-shaped structure, and wherein said branch portions adjacent their adjoining edges are provided with inwardly protruding edge flanges, the exterior surface of each of said branch portions being of unbroken cylindrical shape with half-circular cross section.

30. A pipe system according to claim 29, in which the outer radius of the branch portions are approximately equal to the interior radius of the ends of tube casings of an immediately adjacent one of said pipe units.

31. A pipe system according to claim 29, further comprising a split reduction ring to be tightened in between the casing and a protective tube of reduced diameter.

32. A pipe system according to claim 29, in which at least one of the shells is provided with outwardly protruding anchoring portions and with inwardly protruding portions adapted to be welded to the conductor tube passing through the respective associated casing.

33. A pipe system according to claim 1, wherein said interior and exterior tubes are concentric to one another.

34. A method of providing a tight elbow or T-branch section in a system of heat insulated pipes of the type comprising a plurality of insulated pipe units, each pipe unit including at least one interior conductor tube, an exterior protective mantle tube, and a heat insulating material interposed between said interior and exterior tubes, each of said conductor tubes having at both ends an end portion extending beyond the end of the corresponding exterior tube of the respective pipe unit, these end portions of the consecutive pipe units being joined and covered by an insulating tube casing bridging the adjacent ends of the exterior mantle tubes of the respective pipe units, said method comprising the steps of connecting, by welding or otherwise the end portions of adjoining pipe units with a desired angle therebetween, placing at one side of the joint a rigid shell member forming one half of a tube element of a shape similar to the elements formed by the joined end portions, but having considerably larger diameter and larger length, said tube element being divided along a common diammetrical plane for the different portions of the tube element, placing at the other side of the joint a rigid shell member formed by the other half of said tube element, joining the plane edges of the two shell members in such a position thereof that the cylindrical ends of the tube element thus formed project over the adjacent ends of the exterior mantle tubes of the joined pipe units, whereby, when the shells are tightened together, the said cylindrical ends of the tube element are pressed sealingly against the exterior surface of the mantle tubes, while the plane edges of the shells are pressed sealingly together.

35. A heat insulated pipe system comprising:
   a plurality of insulated pipe units; each pipe unit including an axially rigid interior conductor tube, an exterior protective mantle tube of relatively rigid material, and a heat insulating material interposed between said interior and exterior tubes; each of said conductor tubes having an end portion extending beyond the end of the corresponding exterior tube of the respective pipe unit, the end portion of one conductor tube being axially rigidly joined with the end portion of another conductor tube to form a conductor tube joint,
   tube casing means for bridging the conductor tube joint and overlapping adjacent end portions of the exterior tubes,
   and clamping means for rigidly and sealingly clamping said tube casing means around the end portions of the exterior tubes,
   wherein the conductor tubes which are joined at a respective conductor tube joint are constructed such that axial movements of said conductor tubes with respect to one another are precluded at least in the area of said conductor tube joints,
   and wherein the tube casing means, clamping means, and the exterior tubes overlapped by said tube casing means are constructed such that axial movements of said exterior tubes with respect to one another are precluded at least in the area of said conductor tube joints each that, during use of the system with a fluid medium flowing through said conductor tubes at a different temperature than the medium surrounding the exterior tubes, thermally induced relative axial movements of the conductor tubes with respect to one another and thermally induced relative axial movements of the exterior tubes with respect to one another in the area of said conductor tube joints are precluded.

36. A pipe system according to claim 35, wherein said tube casing means comprises a plurality of part-cylindrical shells of rigid material.

37. A pipe system according to claim 36, wherein said plurality of part-cylindrical shells includes two half-cylindrical shells.

38. A pipe system according to claim 37, characterized in that said clamping means includes means for clamping said half-cylindrical shells so tightly around said exterior tubes that the end portions of said exterior tubes are compressed to a reduced diameter.

* * * * *